(12) United States Patent
Genz et al.

(10) Patent No.: US 9,249,046 B2
(45) Date of Patent: Feb. 2, 2016

(54) METHODS FOR MAKING A GRADED-INDEX MULTIMODE PREFORM AND FIBER

(71) Applicant: j-fiber GmbH, Jena (DE)

(72) Inventors: Christian Genz, Jena (DE); Wolfgang Haemmerle, Jena (DE); Lothar Brehm, Jena (DE)

(73) Assignee: j-fiber, GmbH, Jena (DE)

( * ) Notice: Subject to any disclaimer, the term of this patent is extended or adjusted under 35 U.S.C. 154(b) by 79 days.

(21) Appl. No.: 13/945,142

(22) Filed: Jul. 18, 2013

(65) Prior Publication Data

US 2014/0020431 A1   Jan. 23, 2014

(30) Foreign Application Priority Data

Jul. 18, 2012   (DE) .......................... 10 2012 106 478

(51) Int. Cl.
 *C03B 37/018*   (2006.01)
(52) U.S. Cl.
 CPC ....... *C03B 37/01815* (2013.01); *C03B 2203/26* (2013.01); *C03B 2207/66* (2013.01); *C03B 2207/70* (2013.01)
(58) Field of Classification Search
 None
 See application file for complete search history.

(56) References Cited

U.S. PATENT DOCUMENTS

| | | | |
|---|---|---|---|
| 4,568,370 A | 2/1986 | Powers | |
| 6,532,773 B1 | 3/2003 | Mazzarese et al. | |
| 2005/0041943 A1* | 2/2005 | Milicevic et al. | 385/123 |
| 2011/0044596 A1 | 2/2011 | Zhang et al. | |
| 2013/0067960 A1* | 3/2013 | Milicevic et al. | 65/391 |
| 2013/0067961 A1* | 3/2013 | Milicevic et al. | 65/391 |

FOREIGN PATENT DOCUMENTS

| | | |
|---|---|---|
| DE | 60000283 T2 | 12/2000 |
| GB | 2118165 A | 10/1983 |

* cited by examiner

*Primary Examiner* — Lisa Herring
(74) *Attorney, Agent, or Firm* — Kuta IP Law, LLC; Christine M. Kuta

(57) ABSTRACT

Methods for making a preform for a graded-index multimode fiber by using an inside deposition process are disclosed. The methods are characterized by an iterative refractive index profile correction with the following steps: determining a target refractive index profile for the preform to be produced, carrying out an inside deposition process with fixed volume flows for the reacting gases inside a tube and a given burner speed for all deposited layers, collapsing the tube and measuring the actual refractive index profile, comparing the target profile with the actual profile and calculating a correction value of index differences, converting this correction value in corrected burner speeds as varying process parameter, carrying out a inside deposition process with fixed gas flows and corrected burner speeds for all layers to be deposited.

6 Claims, 2 Drawing Sheets

METHODS FOR MAKING A GRADED-INDEX MULTIMODE PREFORM AND FIBER

BACKGROUND

The core refractive index profile of a graded-index multimode preform and the fiber made thereof is characterized mainly by three parameters. These parameters are core diameter, maximum refractive index difference between the core and the cladding, and the profile of the refractive index of the core. A graded-index profile is generated by depositing a certain number of core layers. In order to optimise the graded-index profile, it is helpful to enhance the number of single layers to minimize the refractive index structures in the radial direction. By enhancing the number of core layers, the productivity of the deposition process is decreased. Conventionally the core layers are produced by a vapour deposition process, e.g. modified chemical vapour deposition (MCVD), plasma inside/outside vapour deposition (PIVD/POVD) or outside vapour deposition (OVD).

The MCVD process uses a layer specific precursor composition to achieve a desired refractive index profile. The gases in the composition react within a hot zone to dope glass and deposit it on the inner surface of a tube. At the start of the process, a burner is located at the inlet part of the tube. There are different chemical reaction and deposition conditions at the tube opening than in the middle or at the end of the tube. The opening region has changing core diameter and refractive index profile and is called the preform taper. The preform taper is a section of the tube where the gas composition enters the tube and this section is characterized by non-uniform and non-constant optical and geometrical properties. Depending on the process parameters used, the taper can typically have a length of 20 to 40 cm including the geometric and the profile taper. Within the profile taper, the refractive index profile can be described in first approximation by the profile exponent (also referred to as the alpha value). In general, the preform and fiber parameters of the taper region are so different and uncontrolled, that it is often not possible to use the fibers obtained from this preform region.

Glass soot is generated inside of the tube by an outer heat source in the MCVD process. This soot is deposited along the inner tube wall. Due to certain reaction, transport and deposition mechanisms using a homogenous gas phase reaction, a particular deposition course is generated along the tube. This soot deposition course is called a deposition function after the soot has been consolidated to transparent glass layers. The local changing single layer thickness and single layer refractive index at the inlet part of the deposition tube results in a need to reduce the preform taper.

Information relevant to attempts to address the problems described above can be found in the references described below.

German patent DE 60000283 T2 discloses a method for making a preform having a defined refractive index profile using a controlled reactive gas composition in a chemical vapor deposition (CVD) process. In addition to the composition (concentration of dopands), the velocity of the gas is aligned to reduce deviations in the refractive index profile. The criteria for optimisation is the deviation of the measured refractive index profile from the predetermined refractive index profile. The correction of the measured refractive index profile is carried out by adjusting the composition of the reactive gases as a function of time during the deposition process. To increase the accuracy of the profile measurements and the quality of corrections, the preform measurement is carried out at certain axial tube positions and angles. Additional preforms can be used to calculate a mean deviation.

The method described in DE 60000283 T2 yields unsatisfying results because the correlation of local and temporal profile deviations and the composition of the reactive gases is not acceptably precise. The mass flow controller typically used in dosing units bears only discrete adjusting possibilities and often has a time delay of some seconds. This is typically considered to be quite slow. In addition, there are effects on concentration mixing starting in the origin of the precursors, typically an evaporator, over the pipework up to the deposition area. By these mixing effects, mostly dopand diffusion, turbulent gas flow in the pipework, the modification of the gas composition is not sharp and the resulting profile correction is locally imprecise.

Another method for a correction of the refractive index profile based on preform as well as fiber profile measurements is described in U.S. published application U.S. 2011/0044596 A1. The given index profile is defined on the preform or based on the profile of the fiber. In this method, deviations of the refractive index profile are converted into changes of gas compositions and used in the CVD-process. The reaction time in the hot zone can be influenced by the velocity of the gases. Since the conversion of refractive index deviations to changes in the volume of the reacting gases can only be approximated, it is necessary to run several iteration cycles to obtain the desired refractive index profile.

In United Kingdom patent GB 2118165 A, a method to reduce the geometrical taper of preforms is described. A smaller geometrical taper is essential for good fiber quality but is not sufficient. A non-linear course of the support speed along the tube length is disclosed, which is optimised in an iterative manner.

Another known method for the profile correction of preforms built up by single layers in an inside/outside deposition process includes the variation of the gas flows of the precursor halides to reduce systematic deviations of single layer thickness and/or concentration. It has been shown that by controlling the gas flows, only locally indistinct layer thickness and refractive index changes can be employed. This is based on the time delay of the mass flow controllers, the mixing effects in the pipework from the evaporator to the reaction zone and turbulent gas flows through the reaction tube system. It is generally difficult to achieve locally precise changes in refractive index or layer thickness.

There remains a need for improved methods for the manufacture of graded-index multimode preforms particularly to reduce the front preform taper range

SUMMARY

The present inventions are directed to methods for making graded-index multimode preforms using inside deposition. One method for the making of a preform for a gradient-index multimode fiber uses a novel inside deposition process. The inside deposition process begins with a refractive index profile correction method that is carried out iteratively. First, a target refractive index profile for the preform is determined. A number of layers are deposited using inside deposition with fixed volume flows for the reacting gases and with fixed burner speeds for all deposited layers. The deposited tube is then collapsed and the resulting refractive index profile is measured. The measured profile is compared to a target profile and correction values are calculated. The correction values are converted into corrected burner speeds. The inside deposition is then performed with another tube. The inside deposition is performed with fixed volume flows for the reacting gases and corrected burner speeds for each individual deposited layer.

It is an object of this invention to describe a method for the production of a graded-index multimode preform, where a profile correction can be carried out precisely and reliably with minimized investment in labor and devices.

In a first embodiment, in a first step, a target refractive index profile for the preform to be produced is provided. In a second step, an inside deposition process is carried out with fixed volume flows of the reacting gases and a fixed burner speed along the tube length for all layers to be deposited. The tube is then collapsed and the actual refractive index profile is measured. A comparison of the target and actual refractive index profile is carried out and a correction values for the index profile are obtained. These correction values are converted into changes to the speed of the burner from layer number to layer number for different tube length positions. The burner speed values are the parameters varied. In a consecutive step, the inside deposition is repeated with the fixed gas volume flows and the corrected burner speeds. This process is repeated iteratively.

A benefit of the methods described herein is a correction the refractive index profile of the optical fiber. This is accomplished by varying the speed of the burner while keeping the gas flow volumes constant. In contrast to conventional art where the deviations are corrected by gas flow changes, which cannot be controlled precisely, in the methods disclosed herein, the correction is carried out by changing the speed of the burner, which can be controlled more precisely. Furthermore, it has been shown that there is an explicit and simple formula for the correlation between burner speed and the refractive index profile. Application of these methods employing this correlation reduces the number of trial runs based on experience and individual know-how.

In a preferred embodiment of the correction method, the measurement of the refractive index is carried out along the length of the collapsed preform. A deviation between the target refractive index and the measured refractive index in the taper range is calculated for each axial position of the preform. Furthermore a control of the quality of the refractive index over the complete length of the preform is possible.

In an alternative embodiment, the change in the burner speed results in a varying thickness of the single layers, but the sum of the thicknesses of the single layers is kept constant. In this method, an adjustment of the profile exponent of the graded refractive index profile is achieved.

In another embodiment, a deposition function depending on the sum of gas flows is used by calculating the correction function for the burner speed, whereas the maximum thickness of the deposition function is used to calculate the thickness of every single layer locally dependent. The deposition function describes the deposition rate in the hot zone of the burner by implementing the flowing reaction gases, the axial burner temperature profile and the burner speed.

It is particularly preferred to use the method described above for corrections of refractive index profiles which show a radial dependence dn/dr<0, i.e., a continuously decreasing refractive index when the radius increases.

The present inventions together with the above and other advantages may be understood from the following detailed description of the embodiments of the inventions illustrated in the drawings, wherein:

DRAWINGS

DESCRIPTION

The refractive index profile correction methods according to these inventions aim at reducing the geometrical taper as well as the profile taper. By a specific course of the burner speed in the taper region, which is commonly equal for all core layers, it is possible to reduce the geometrical taper only. This taper is the sum of the tapers of all single layers and can be improved by adjusting the burner speed for all single core layers in the same manner at each taper position.

To reduce the profile taper in the production of graded-index multimode preforms and fibers too, the consistency of the burner speed in all core layers at one axial position has to be considered. It is otherwise supposed, that every single layer is produced with a unique burner speed course.

The present methods for making profile corrections are not limited to corrections in the taper region but can be used in all profile deviations along a substrate tube in the axial as well as the radial direction. To ensure uniqueness within the profile correction, it is desirable to have a refractive index profile dn/dr<0. It is therefore assumed, that the core refractive index within the preform is monotonically decreasing with increasing core radius.

The correction methods according to the inventions achieve a profile correction by varying the thickness of the core layer in radial direction or over the numbers of the core layers. Furthermore, there is a possibility of reducing or even eliminating small profile deviations along the length of the preform. A change in layer thickness is a result of the variation of the burner speed. This change can be realized in a short time period, even within a fraction of a second. So it is possible to optimise the refractive index profile even if the deviations and/or inhomogeneities are situated in very close proximity.

The methods are described based on an example of a graded-index profile. At the beginning of a correction run, there are constant single layer areas at every core layer in the radial and the axial directions.

Under these conditions, the normalized radial position of the single layers can be described based on the assumption of constant single layer areas as:

$$r_k/a = \sqrt{(k/k_{max})}$$

where $r_k/a$ is the relative radius position of the deposited $k_{th}$ core layer within the preform, k is the running number of the core layer, $k_{max}$ is the maximum number of core layers, and a is the core radius within the preform.

The refractive index profile of a graded-index multimode fiber is commonly described by the following profile function:

$$\Delta n_k = \Delta n_{max} \ast [1-(r_k/a)^\alpha]$$

where $\Delta n_k$ is the refractive index of the $k_{th}$ layer at the relative radial position $r_k/a$, a is the core radius of the preform, $\Delta n_{max}$ is the maximum refractive index difference between the core center and the cladding of the preform, and $\alpha$ is the profile exponent.

Figure 1:
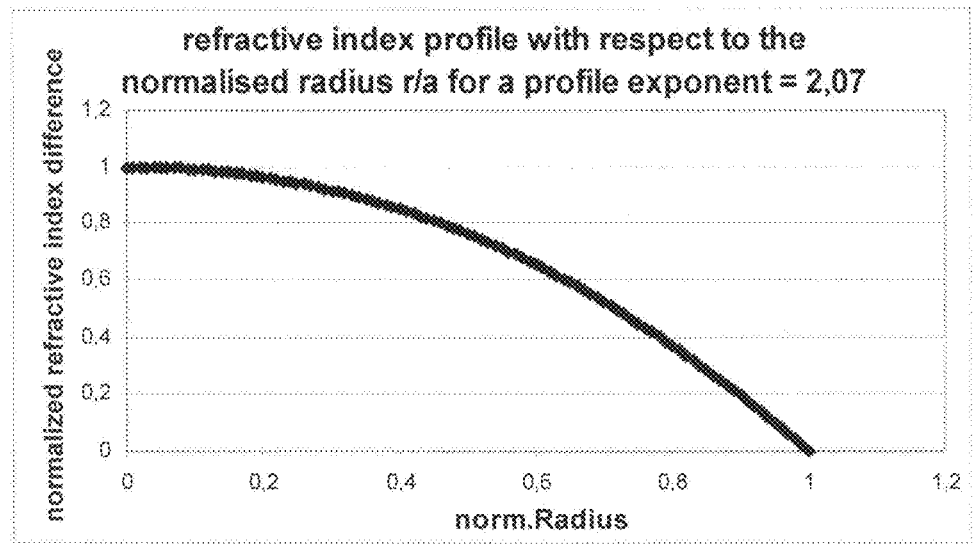
FIG. 1 shows a graded refractive index profile with a profile exponent of $\alpha_0=2.07$ of a fiber according to one embodiment.

As an example, the profile exponent of an ideal refractive index profile with a constant layer thickness is $\alpha_0=2.07$. Such a refractive index profile is shown in the diagram in FIG. 1. The diagram points out the refractive index difference $\Delta n_k$ of the $k_{th}$ core layer with respect to the normalized radius $r_k/a$. Under these conditions, the $k_{th}$ core layer with a radius $r_k$ yields a refractive index difference $\Delta n_k$ with the course shown in FIG. 1.

Figure 2:
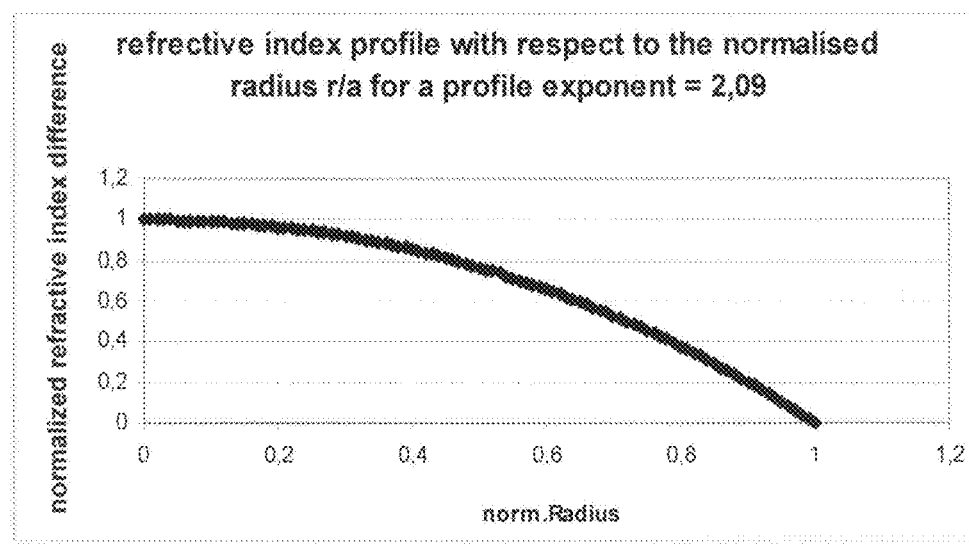
FIG. 2 shows a graded refractive index profile with a profile exponent of $\alpha_0=2.09$ of a fiber according to an alternative embodiment.

If the profile exponent α changes, e.g. from $\alpha_0=2.07$ to $\alpha_1=2.09$, the refractive index difference $\Delta n_k$ of the $k_{th}$ layer results in a new radial position $r'_k$. FIG. 2 shows the refractive index profile which has been altered accordingly. The refractive index difference $\Delta n_k$ of the $k_{th}$ layer with respect to the normalized radius $r_k/a$ with a profile exponent $\alpha_1=2.09$ is depicted.

The calculation of the new normalized core radius $r'_k/a$ of the $k_{th}$ core layer is carried out according to:

$$r'_k/a = \exp[\ln(1-\Delta n_k/\Delta n_{max})/\alpha_1]$$

Figure 3:
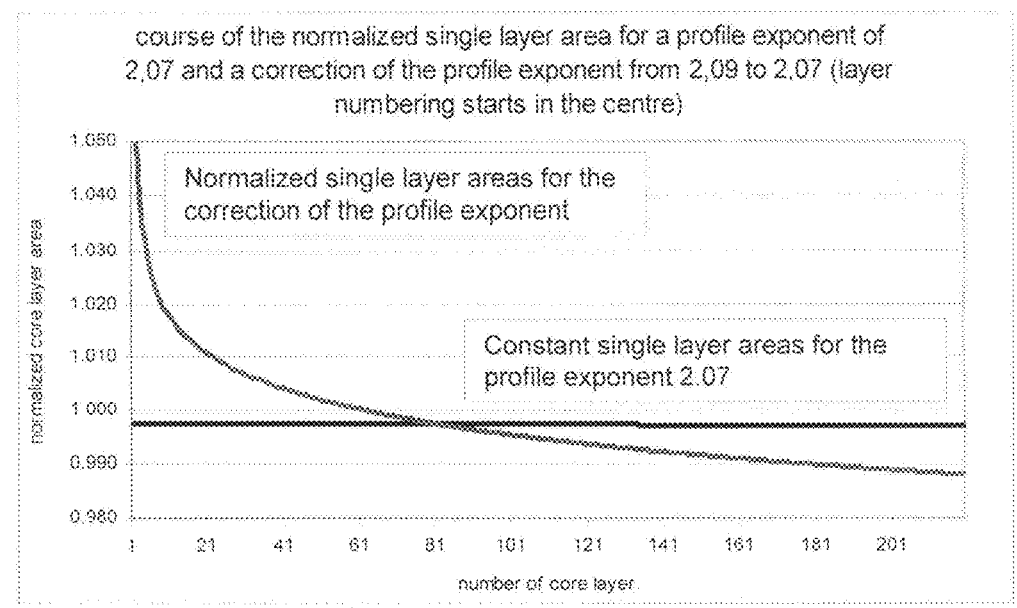
FIG. 3 shows a course of a normalized single layer area for a target profile exponent of $\alpha_0=2.07$ and a measured profile index of $\alpha_0=2.09$ according to a further alternative embodiment.

The resulting change in the single layer area is shown in FIG. 3. The diagram shows the course of the normalized single layer areas for a profile exponent correction with a target $\alpha_0=2.07$ and a measured value of $\alpha_1=2.09$, where the numbering of the core layers starts from the center of the core. It is shown that the profile correction is to be carried out in such a way that core layers which are situated closer to the center of the core should be built thicker and outer core layers should be built thinner. As boundary conditions for the correction, it is practical for the change in the single layers thicknesses to be carried out in a way that the sum of the single layer thicknesses and the core radius of the preform are not affected and that only the profile parameter α is corrected.

In a next step of the correction method, the calculated correction values for the core layer areas and therefore the layer radii $r_k$ are converted into corrected values for the burner speed. The burner speed therefore constitutes the variable parameter for the correction method.

The core layer area of the $k_{th}$ core layer $F_k$ is proportional to the radius $r_k$ of the $k_{th}$ core layer and their individual thickness $d_k$. If it is assumed that the cross-section area of each deposited core layer can be described as a circular ring. The core layer area $F_k$ and the change in the core layer area is correlated to the burner speed during the deposition process by the following relationship:

$$\Delta V_{B,k} = -V_{B,k} * \Delta F_k / F_k$$

where $\Delta V_{B,k}$ is the correction value of the burner speed of the $k_{th}$ core layer, $V_{B,k}$ is the burner speed of the $k_{th}$ core layer, $\Delta F_k$ is the correction value of the $k_{th}$ core layer area, and $F_k$ is the $k_{th}$ layer area. From the given formula, it can be seen that a positive correction $\Delta F_k$ of the core layer area results in a negative correction $\Delta V_{B,k}$ of the burner speed. The core layer area increases with a reduced burner speed and decreases with an increased burner speed.

The correction method is carried out by producing a first preform and measuring the refractive index profile in a second step. This actual refractive index profile is compared with the target profile and the correction values for single radii $r_k$ or single layer thickness $d_k$ are calculated. These values can be converted to corrected values $\Delta F_k$ and further to corrected values for the burner speed $\Delta V_{B,k}$. These corrected burner speed values $\Delta V_{B,k}$ are transferred to a control unit for the burner speed, and then can be used as the burner speed values for the next preform production. Usually this second preform has a minimized profile exponent deviation, which is within specified tolerances.

Figure 4:
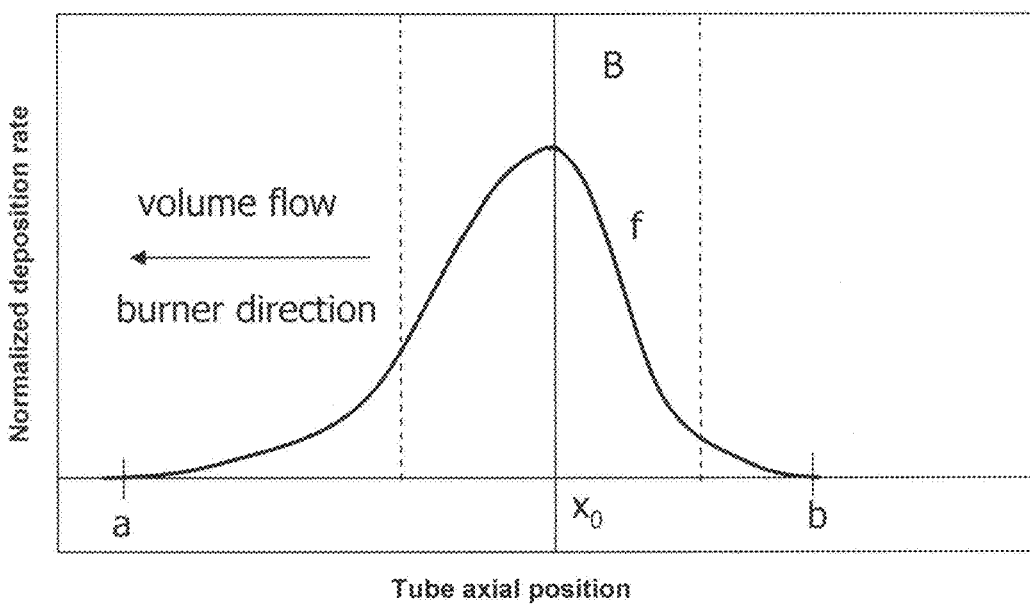
FIG. 4 shows an illustrative deposition function according to principles of the inventions.

A refinement of the correction methods can be achieved by including the deposition function f in the correction. An exemplary deposition function is shown in FIG. 4. The local position of the burner is labelled by $x_0$. The zone which is heated by the burner contains an interval which is labelled B in the diagram. In the given example the burner moves from the right side to the left and the reacting gases flow through the inside of the tube from the right side to the left as well. The deposition function f bears an asymmetric shape. This asymmetry is mainly based on the direction of the reacting gas volume flow and the direction of movement of the burner. A displacement of the burner to the left and the deposition function is displaced accordingly. Furthermore the direction in which deposition can take place is predetermined by the direction of the reacting gas volume flow. The particles to be deposited cannot move against the gas flow direction, but do always move with the gas flow.

With a correction to the $k_{th}$ core layer area, the deposition region downstream of the burner region is broadened locally, while the delivered reaction gas as well as the glass material are deposited in different regions with varying deposition efficiency. The deposition function accounts for this local deposition rate. Due to the local broadening of the deposition function an effective core layer area change results with respect to the overall gas flow through the tube with a maximum approximately 5 to 15 cm downstream of the burner position. This local broadening of the deposition function downstream of the burner position is specific for inside-deposition processes and modifies the profile correction. The deposition function $f_k(x,t)$ for the $k_{th}$ core layer accounts for the deposition profile in proximity to a position x in the preform and further to the temporal displacement of the burner. Therefore, it is correlated to the position and time.

The asymmetry of $f_k(x,t)$ takes into account the increased deposition rates downstream.

The method for changing the radial profile shape is not limited to profile changes which can be described by a profile exponent change. In contrast a wide variety of profile shape with dn/dr<0 can be corrected by controlled changes to the single layer thickness.

It is to be understood that the above-identified embodiments are simply illustrative of the principles of the inventions. Various and other modifications and changes may be made by those skilled in the art which will embody the principles of the inventions and fall within the spirit and scope thereof.

We claim:

1. A method for determining a refractive index profile correction for use in making a graded-index multimode fiber through inside deposition, comprising:
   (a) providing a target refractive index profile for the graded-index multimode fiber;
   (b) performing an inside deposition within a tube, the tube having a length and a diameter, the inside deposition using reactive gases and a burner, the inside deposition using a fixed volume flow for the reactive gases and a first burner speed for the burner to deposit a plurality of layers in the tube;
   (c) collapsing the tube to make a preform;
   (d) measuring a refractive index profile of the preform;
   (e) comparing the measured refractive index profile to the target refractive index profile and calculating correction values;
   (f) converting the correction values to a corrected burner speed for a plurality of layers at least at one position along the length of the tube;

(g) making a preform according to steps (b) and (c) with inside deposition using the fixed volume flow and substituting the corrected burner speed from step (f) for the first burner speed of step (b); and (h) repeating steps (d)-(g) until a measured refractive index profile that substantially matches the target refractive index profile is obtained, and the corrected burner speed of step (f) results in a changed thickness of each deposited layer, wherein the sum of all the individual layer thicknesses is constant such that the measured refractive index profile substantially matches the target refractive index profile over the entire length of the preform.

2. The method of claim 1 wherein the measuring of the refractive index profile of the preform is performed along the preform and the comparison between the measured refractive index profile and the target refractive index profile is performed locally along the preform.

3. The method of claim 1, wherein the correction values are determined along the length of the preform and each correction value is converted to a corrected burner speed for each location along the tube, and the inside deposition of step (g) is then carried out with location-dependent burner speeds.

4. The method of claim 1 wherein a local deposition rate, which is related to the overall gas volume flow in the inside deposition, is included in the determination of the corrected burner speed to calculate a location-dependent thickness of each individual layer in the plurality.

5. The method of claim 4 wherein the local deposition rate is affected approximately 5 to 15 cm downstream of the burner position.

6. The method of claim 1 wherein a corrected burner speed is applied to a radial dependent refractive index profile with continuously decreasing refractive index when the radius increases.

* * * * *